(12) United States Patent
Watanabe et al.

(10) Patent No.: US 8,049,859 B2
(45) Date of Patent: Nov. 1, 2011

(54) LIQUID CRYSTAL DISPLAY DEVICE INCLUDING A RELIEF AREA

(75) Inventors: Noriko Watanabe, Yamatokooriyama (JP); Hidenori Kihara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 653 days.

(21) Appl. No.: 12/090,888

(22) PCT Filed: Sep. 14, 2006

(86) PCT No.: PCT/JP2006/318249
§ 371 (c)(1),
(2), (4) Date: Apr. 21, 2008

(87) PCT Pub. No.: WO2007/083412
PCT Pub. Date: Jul. 26, 2007

(65) Prior Publication Data
US 2009/0290117 A1    Nov. 26, 2009

(30) Foreign Application Priority Data

Jan. 17, 2006 (JP) ................................ 2006-008866
Jul. 13, 2006 (JP) ................................ 2006-193310

(51) Int. Cl.
*G02F 1/1339* (2006.01)
*G02F 1/1333* (2006.01)
(52) U.S. Cl. ......... 349/156; 349/153; 349/155; 349/158
(58) Field of Classification Search .................. 349/153, 349/155, 156, 158
See application file for complete search history.

(56) References Cited

U.S. PATENT DOCUMENTS

| 5,537,235 | A * | 7/1996 | Ishihara et al. | 349/155 |
| 2002/0051112 | A1 * | 5/2002 | Katsura | 349/153 |

FOREIGN PATENT DOCUMENTS

| JP | 58-193518 A | 11/1983 |
| JP | 59-73719 U | 5/1984 |
| JP | 63-064021 A | 3/1988 |
| JP | 05-333300 A | 12/1993 |
| JP | 2000-193953 A | 7/2000 |
| JP | 2000-199891 A | 7/2000 |
| JP | 2001-013508 A | 1/2001 |
| JP | 2001-154204 A | 6/2001 |
| JP | 2002-122871 A | 4/2002 |
| JP | 2004-126197 A | 4/2004 |

OTHER PUBLICATIONS

Official communication issued in the International Application No. PCT/JP2006/318249, mailed on Dec. 19, 2006.
English translation of the Official Communication issued in counterpart International Application No. PCT/JP2006/318249, mailed on Jul. 22, 2008.

* cited by examiner

*Primary Examiner* — David Nelms
*Assistant Examiner* — Nathanael R Briggs
(74) *Attorney, Agent, or Firm* — Keating & Bennett, LLP (57) ABSTRACT

A liquid crystal display device includes a first flexible substrate and a second flexible substrate, a liquid crystal layer sealed between the first substrate and the second substrate by a frame-shaped sealing member, a display area located inside the sealing member, a non-display area located outside the display area and a plurality of spacers interposed between the first substrate and the second substrate. A relief area in which a gap between the first substrate and the second substrate is larger than that in the display area is provided in at least a portion of the non-display area.

7 Claims, 11 Drawing Sheets

LIQUID CRYSTAL DISPLAY DEVICE INCLUDING A RELIEF AREA

BACKGROUND OF THE INVENTION

1. Field of the Invention

The present invention relates to a flexible liquid crystal display device.

2. Description of the Related Art

In recent years, so-called flat panel displays have widely been used as display devices in various fields. As one of such display devices, a liquid crystal display device has broadly been used in the field of mobile displays such as cellular phones and PDAs by taking advantage of its advantages of thinness, lightness and low power consumption. In this field, there is a growing demand for thinner and lighter displays and flexibility for realizing wearable displays is also required. Therefore, use of a flexible substrate made of plastic or the like instead of glass has been under review.

Figure 23:
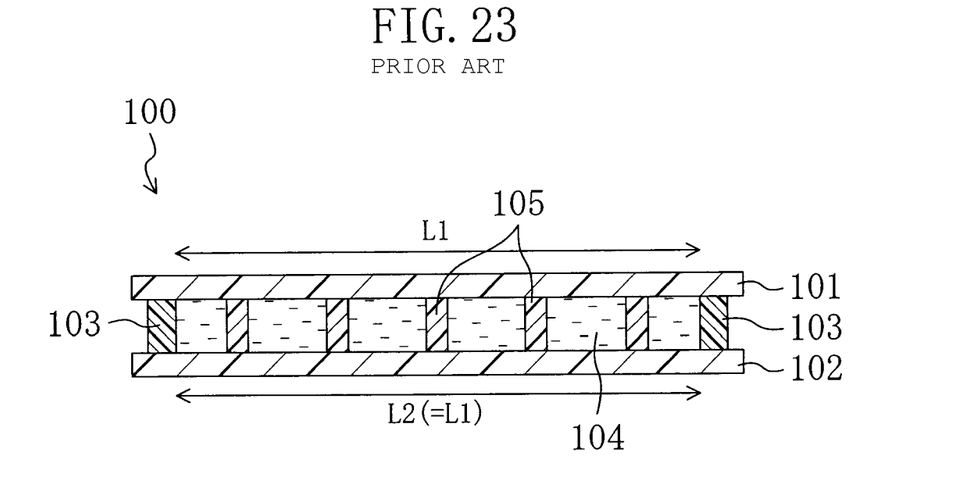
FIG. 23 is a sectional view illustrating the conventional liquid crystal display device in a flat state.

As shown in a sectional view of FIG. 23, a liquid crystal display device 100 includes a first flexible substrate 101, a second flexible substrate 102 and a liquid crystal layer 104 sealed between the substrates 101 and 102 by a rectangular frame-like sealing member 103. The thickness of the liquid crystal layer 104 is controlled by spacers 105 provided between the substrates 101 and 102. The spacers 105 may be glass or resin particles of uniform particle size or columnar photo spacers. FIG. 23 shows a plurality of photo spacers 105 formed on the first flexible substrate 101.

An area enclosed with the sealing member 103 functions as a display area which contributes to display and a peripheral area outside the display area is a frame area which does not contribute to display. When the liquid crystal display device 100 is in a flat state, the width L1 of the display area on the first flexible substrate 101 is equal to the width L2 of the display area on the second flexible substrate 102 as shown in FIG. 23.

Figure 24:
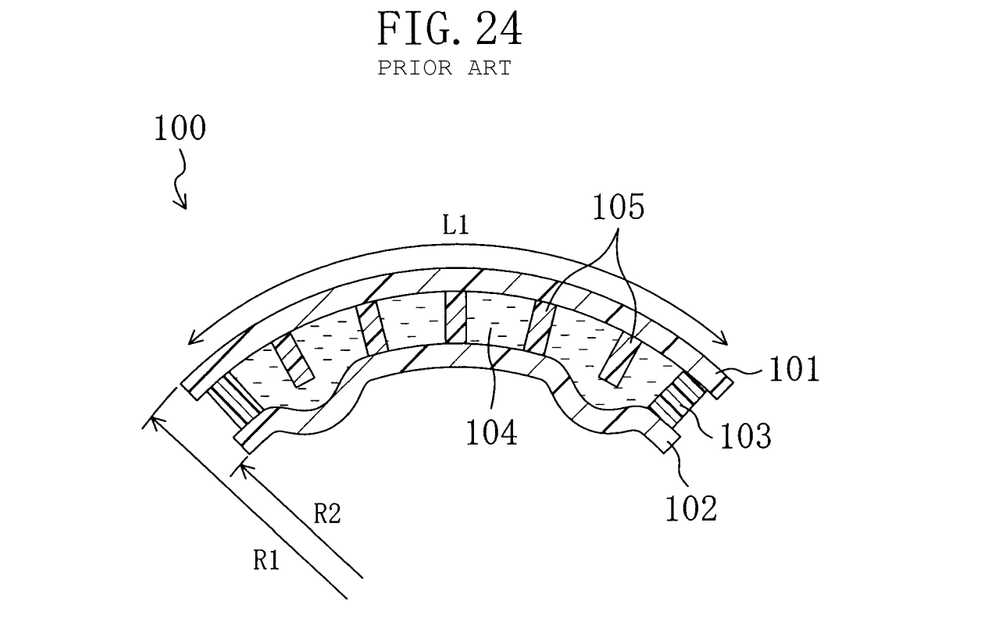
FIG. 24 is a sectional view illustrating the conventional liquid crystal display device in a bent state.

When the liquid crystal display device 100 is bent such that the first flexible substrate 101 protrudes outward, tensile force is applied to the outside first flexible substrate 101 and compression force is applied to the inside second flexible substrate 102 as shown in a sectional view of FIG. 24 due to the difference between the radii of curvature R1 and R2 of the first and second flexible substrates 101 and 102.

As a result, when the liquid crystal display device 100 is bent, the compression force is applied in the thickness direction to part of the liquid crystal layer in the middle of the display area. At the same time, part of the second flexible substrate 102 in the display area close to the sealing member 103 is convexly deformed (protrudes in the direction toward the center of curvature) and the cell gap increases. Further, peel stress is applied to part of the second flexible substrate 102 near the sealing member 103 in the direction away from the first flexible substrate 101.

Due to the existence of the spacers 105 such as photo spacers, the cell gap in the middle of the display area is not reduced below the thickness of the spacers 105. On the other hand, in the vicinity of the sealing member 103, the cell gap and the peel stress on the sealing member 103 become larger as the radii of curvature R1 and R2 become smaller. Since the stress is continuously applied to the sealing member 103, the liquid crystal display device 100 becomes less reliable. Further, the increase of the cell gap leads to reduction of display quality in the vicinity of the sealing member 103.

As a solution to the cell gap failure, a liquid crystal pool is provided between the display area and the sealing member (see, for example, Japanese Unexamined Patent Publication No. 2000-199891). To be more specific, as shown in a perspective view of FIG. 25, a liquid crystal display device 100 according to Japanese Unexamined Patent Publication No. 2000-199891 includes liquid crystal pools P1 formed in areas W1 and W2 on the edges of a bent display panel in the bending direction of the panel (hereinafter merely referred to as the edge areas). In each of the edge areas W1 and W2, linear sealing members 108 are arranged inside the sealing member 103 in a broken line pattern extending parallel to the sealing member 103. An area partitioned by the linear sealing members 108 and the sealing member 103 outside the linear sealing members 108 is the liquid crystal pool P1. A display area 110 is formed between the broken lines made of the linear sealing members 108.

Figure 25:
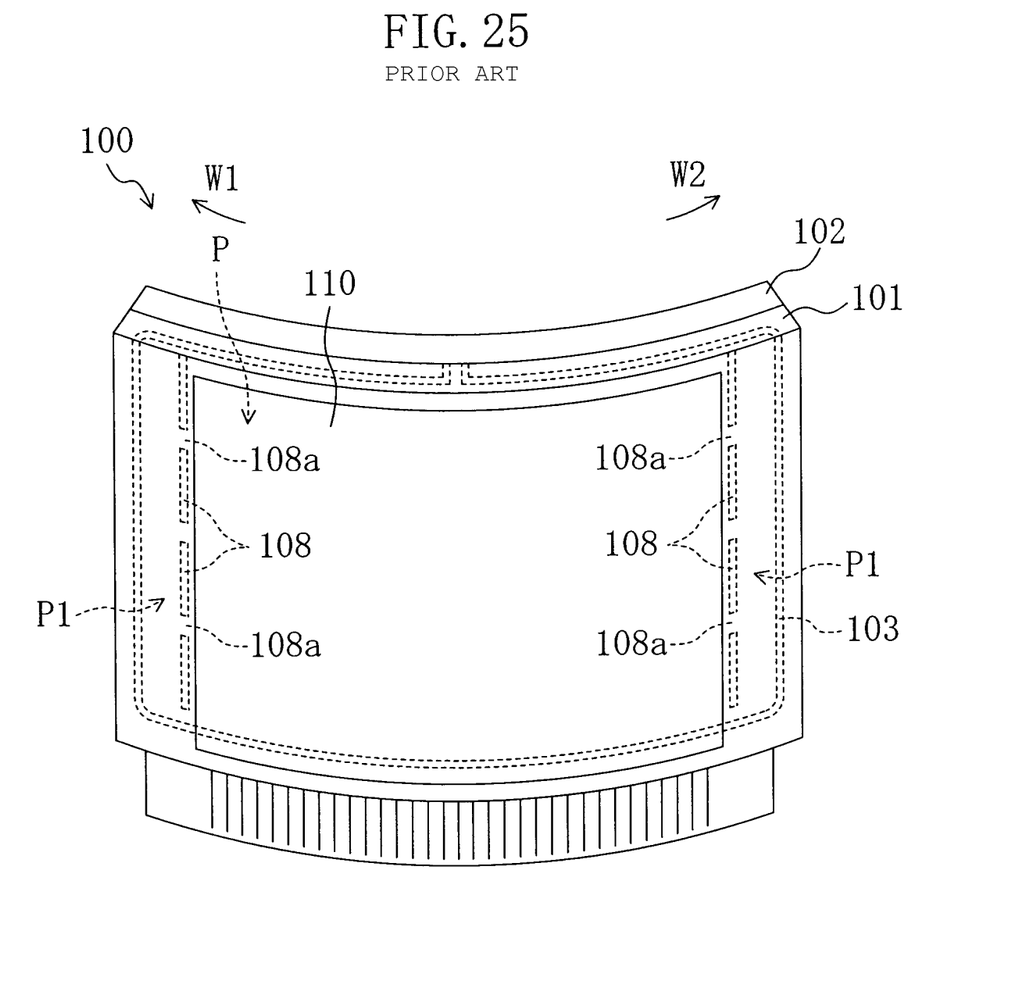
FIG. 25 is a perspective view illustrating a conventional liquid crystal display device having liquid crystal pools in a bent state.

When the liquid crystal display device 100 of Japanese Unexamined Patent Publication No. 2000-199891 is bent, liquid crystal in the display area 110 flows toward the edge areas W1 and W2 and overflows into the liquid crystal pools P1 through gaps 108a between the linear sealing members 108. With this configuration, the possibility of occurrence of the cell gap failure in the vicinity of the sealing member 103 is reduced and the cell gap in the display area 110 is kept uniform for the purpose of preventing the reduction of display quality.

In general, the liquid crystal display device is a flexible display panel using a flexible plate. Therefore, the peel stress is easily applied to the sealing member due to local deformation not only when the panel is intentionally bent but also in usual work on the liquid crystal display device.

As a countermeasure to this, the thickness of the sealing member is set larger than the cell gap in the display area (See, for example, Japanese Unexamined Patent Publication No. 2001-13508 and Japanese Unexamined Patent Publication No. 58-193518). According to Japanese Unexamined Patent Publication No. 2001-13508, as shown in a sectional view of FIG. 22, the diameter of spacer particles 106 contained in the sealing member 103 is set larger than the thickness of the spacers 105 in the display area 110 between the first and second flexible substrates 101 and 102 such that the thickness of the sealing member 103 becomes larger than the cell gap in the display area 110. Likewise, the sealing member according to Japanese Unexamined Patent Publication No. 58-193518 is also thickened. This configuration is intended to improve the uniformity in display of the liquid crystal display panel using the flexible plate.

For the liquid crystal display device of Japanese Unexamined Patent Publication No. 2000-199891, it is impossible to prevent the increase of the cell gap in the vicinity of the linear sealing members due to the difference in radius of curvature between the first and second flexible substrates as explained with reference to FIG. 24. That is, the display quality may deteriorate in part of the display area near the linear sealing members due to the cell gap failure.

Figure 22:
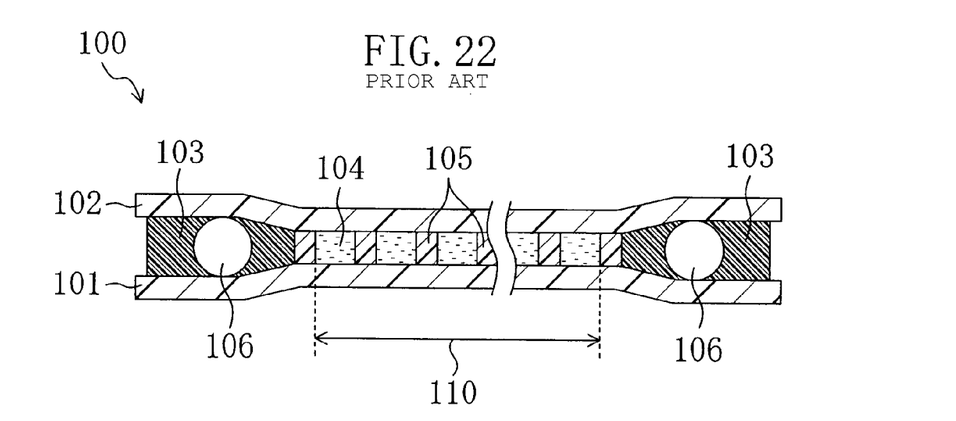
FIG. 22 is a sectional view illustrating the structure of a conventional liquid crystal display device.

As to the liquid crystal display devices of Japanese Unexamined Patent Publication No. 2001-13508 and Japanese Unexamined Patent Publication No. 58-193518, part of the sealing member 103 in which the spacer 106 exists has the same thickness as the diameter of the spacer 106, while part of the sealing member 103 near the display area 110 is gradually reduced in thickness toward the display area 110 as shown in FIG. 22. This is because the sealing member 103 is spread to an inside area where the cell gap is smaller than the thickness of the spacer 106 when the plates are bonded. Therefore, part of the sealing member 103 near the interface with the liquid crystal layer 104 becomes thinner than the middle part thereof.

Specifically, the cell gap at an interface between the sealing member 103 and the display area 110 is substantially the same as that in the display area 110. Therefore, the peel stress is applied to the sealing member 103, which leads to the reduction in reliability of the liquid crystal display device.

SUMMARY OF THE INVENTION

In order to overcome the problems described above, preferred embodiments of the present invention prevent the reduction of display quality of the liquid crystal display device including a flexible plate as much as possible and improve the reliability of the device.

In order to achieve the advantages described above, a preferred embodiment of the present invention, a liquid crystal display device includes a relief area in at least a portion of a non-display area.

To be more specific, a liquid crystal display device according to a preferred embodiment of the present invention includes, a first flexible substrate; a second flexible substrate arranged to face the first substrate; a liquid crystal layer sealed between the first substrate and the second substrate by a frame-shaped sealing member; a display area located inside the sealing member and arranged to contribute to display; a non-display area located outside the display area and does not contribute to the display; and a plurality of spacers interposed between the first substrate and the second substrate and have a height which determines a thickness of the liquid crystal layer, wherein a relief area in which a gap between the first substrate and the second substrate is larger than that in the display area is provided in at least a portion of the non-display area.

It is preferable that the display area is substantially rectangular and the relief area is arranged to extend along the side of the display area which is not bent. The relief area may be a frame-shaped area enclosing the display area.

It is preferable that a wall taller than the spacers is interposed between the first substrate and the second substrate in at least a portion of the non-display area and the relief area is located in a portion of the non-display area inside the wall.

It is preferable that the wall is arranged between the display area and the sealing member.

It is preferable that the display area is substantially rectangular and the wall is arranged to extend along the side of the display area which is not bent. The wall may be in the shape of a frame enclosing the display area.

The relief area relieves a force applied to the first substrate and the second substrate.

It is preferable that the relief area is in contact with a sealing area in which the sealing member is provided.

It is preferable that a gap between the first substrate and the second substrate in the vicinity of an interface between the relief area and the sealing area is larger than that in the display area. Further, a height of the sealing member in the vicinity of an interface between the relief area and the sealing area may be larger than the gap between the first substrate and the second substrate in the display area.

It is preferable that the sealing member is made of a thermoplastic resin.

A spacer for the non-display area which is taller than the spacers provided in the display area may be located in the non-display area and a maximum thickness of the relief area may be determined by the height of the spacer for the non-display area.

At least one of the first substrate and the second substrate may be deformed to protrude outward in a thickness direction of the liquid crystal layer so as to define the relief area.

At least one of the first substrate and the second substrate may be configured to have a level difference on the surface thereof facing the liquid crystal layer to define the relief area.

Since the plurality of spacers are interposed between the first and second substrates, the gap between the first and second substrates in the display area is kept uniform. In at least a portion of the non-display area, a relief area in which the gap between the first and second substrates is larger than that in the display area is provided. Therefore, tensile and compression forces exerted on the first and second substrates which are bent by applying force are relieved by the relief area.

For example, when the first substrate is bent such that the first substrate protrudes outward, the edges of the first substrate in the bending direction in the relief area are deformed to return from the bent state to the flat state. At the same time, the edges of the second substrate in the bending direction in the relief area are slightly recessed toward the first substrate. That is, unlike the conventional devices, significant protrusion of a portion of the second substrate in the direction away from the first substrate is prevented. Further, since the spacers are provided in the display area, the gap between the substrates in the display area (cell gap) is kept uniform. As a result, the cell gap failure in the display area is prevented and the reduction of display quality is less likely to occur. The application of the peel stress to the sealing member is also prevented and the reliability of the device is improved. The effect is also achieved if the device is bent in a reverse manner such that the second substrate protrudes outward.

The relief area may be provided in at least a portion of the non-display area by forming a wall taller than the spacers between the substrates. Specifically, in an area where the wall is formed, the gap between the first and second substrates is larger than that in the other area. Further, since the first and second substrates are flexible, the gap between the substrates is gradually reduced in the direction from the wall to the inside (toward the display area), i.e., from the height of the wall to the height of the spacer. Thus, the relief area is formed in a portion of the non-display area inside the wall.

If the display area is substantially rectangular, the deformation of the first and second substrates occurs on two sides of the display area which are not bent. Therefore, if the relief area and the wall are formed along the sides of the display area which are not bent, the cell gap failure is effectively prevented. If the relief area and the wall are in the shape of a frame enclosing the substantially rectangular display area, respectively, the cell gap failure is prevented even if the first and second substrates are bent in any direction.

If the wall is provided between the display area and the sealing member, the wall functions as a barrier for separating the sealing member and the liquid crystal layer. Therefore, in the vicinity of the wall, the sealing member not cured yet is prevented from leaching into the liquid crystal layer as an impurity and the reduction of display quality is less likely to occur.

If the relief area is in contact with the sealing area, the sealing member in contact with the relief area is formed as thick as the relief area. For example, in the vicinity of an interface between the relief area and the sealing area, the gap between the first and second substrates or the height of the sealing member is larger than the gap between the first and second substrates in the display area. Therefore, the sealing member is easily deformed by the compression and tensile forces exerted on the first and second substrates at the interface with the relief area. In other words, the compression and tensile forces exerted on the first and second substrates are relieved by the relief area and the elastic deformation of the sealing member in contact with the relief area.

If the sealing member is made of a thermoplastic resin, favorable elasticity is provided to the sealing member. If a spacer for the non-display area which is taller than the spacers in the display area is located in the non-display area, the maximum thickness of the relief area is easily determined.

The relief area may be formed by deforming at least one of the first and second substrates to protrude outward in the thickness direction of the liquid crystal layer. Alternatively, the relief area may be formed by providing at least one of the first and second substrates with a level difference on the surface thereof facing the liquid crystal layer.

According to various preferred embodiments of the present invention, the relief area is formed in at least a portion of the non-display area. Therefore, a portion of the first substrate and a portion of the second substrate in the relief area are prevented from protruding in the direction away from each other. As a result, the reduction of display quality due to the cell gap failure in the display area is prevented and the sealing member is prevented from falling off. Thus, the reliability of the device is improved.

These and other features, elements, steps, advantages, and characteristics of the present invention will be apparent from the following description of preferred embodiments with reference to the accompanying drawings.

DETAILED DESCRIPTION OF THE PREFERRED EMBODIMENTS

Hereinafter, preferred embodiments of the present invention will be explained in detail with reference to the drawings. The present invention is not limited to the following preferred embodiments. In the drawings, dimensions of components are exaggerated for explanation purpose.

First Preferred Embodiment

Figure 1:
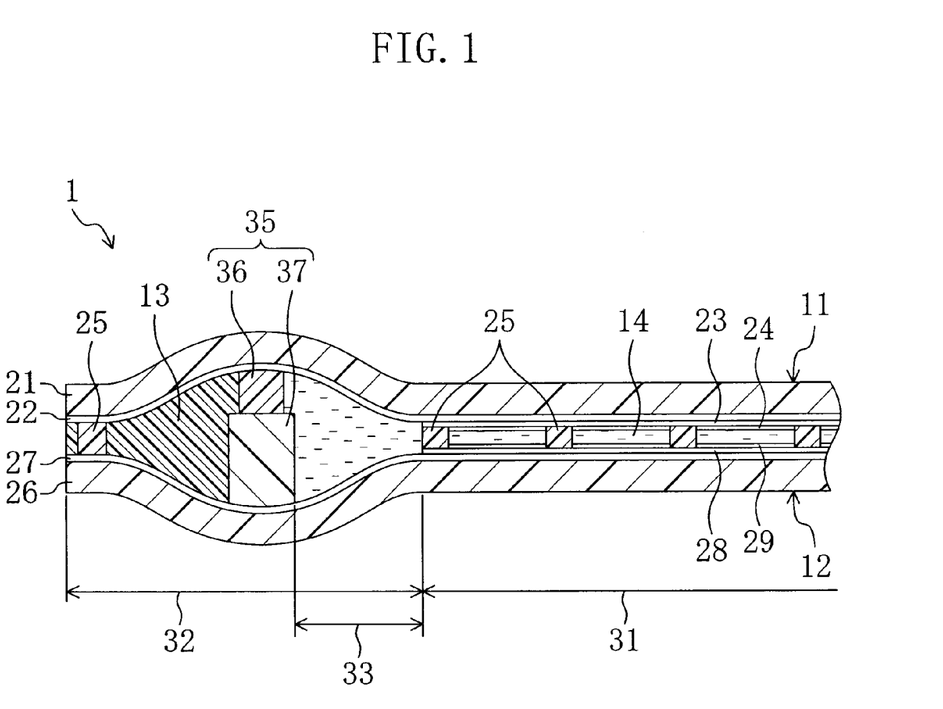
FIG. 1 is an enlarged sectional view illustrating a major portion of a liquid crystal display device according to a first preferred embodiment of the present invention.

FIGS. 1 to 13 illustrate a first preferred embodiment of the present invention. FIG. 1 is an enlarged sectional view illustrating a major portion of a liquid crystal display device 1, FIG. 2 is an enlarged sectional view illustrating two substrates before bonding and FIG. 4 is a sectional view schematically illustrating the structure of the liquid crystal display device 1.

Figure 4:
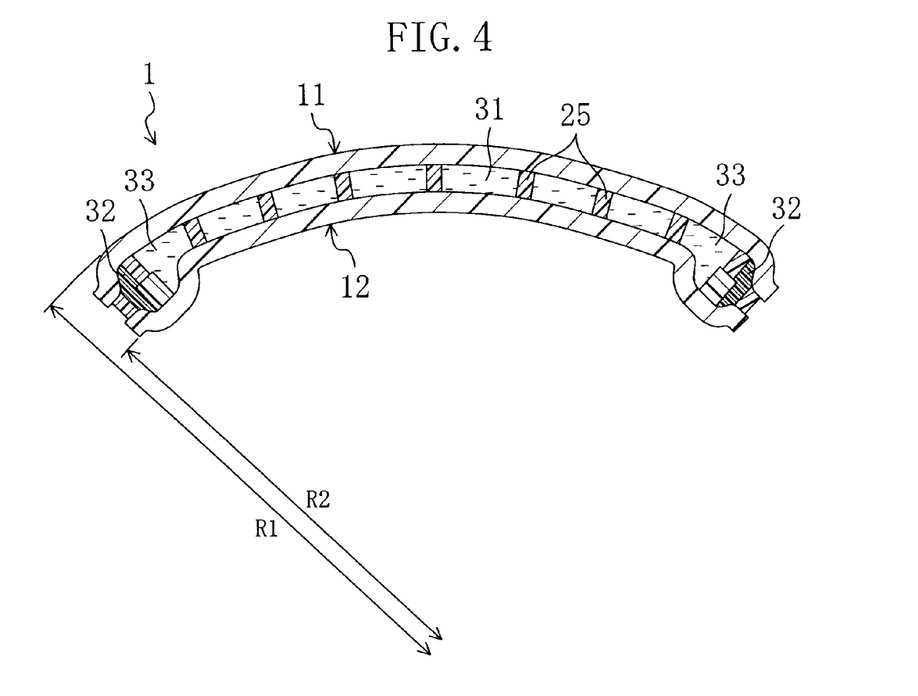
FIG. 4 is a sectional view schematically illustrating the structure of the liquid crystal display device.

As shown in FIG. 4, the liquid crystal display device 1 includes a first flexible substrate 11, a second flexible substrate 12 arranged to face the first substrate 11 and a liquid crystal layer 14 provided between the first and second substrates 11 and 12. The liquid crystal display device is configured to be bendable.

Figure 2:
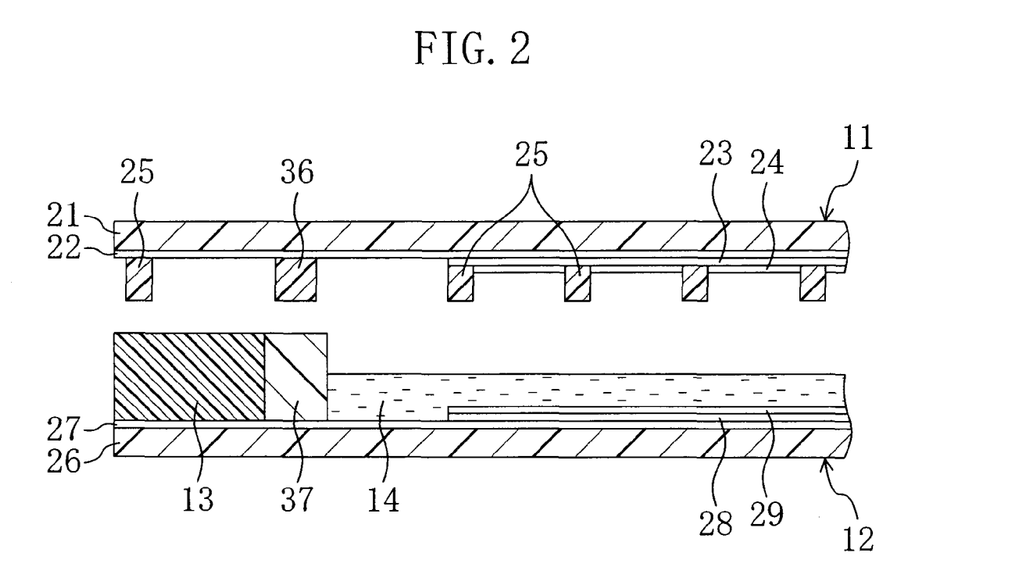
FIG. 2 is an enlarged sectional view illustrating two substrates before bonding.

As shown in FIGS. 1 and 2, the first substrate 11 includes a substantially rectangular plastic plate 21 such as a transparent and flexible polycarbonate plate, a moisture-proof film 22 stacked on the surface of the plastic plate 21 facing the liquid crystal layer 14, a plurality of pixel electrodes 23 stacked on the surface of the moisture-proof film 22, a plurality of thin film transistors (abbreviated as TFTs, not shown) connected to the pixel electrodes 23 and an alignment film 24 covering the pixel electrodes 23 and the TFTs.

A plurality of spacers 25 having a height which determines the thickness of the liquid crystal layer 14 are formed on the first substrate 11 at regular intervals to be sandwiched between the first and second substrates. The spacers 25 may be photo spacers in the shape of columns, e.g., substantially cylindrical columns. The spacers 25 are preferably made of a photosensitive resin and formed over the first substrate 11. The spacers 25 may also be resin particles.

The second substrate 12 includes a plastic plate 26 which is the same as that used in the first substrate 11, a moisture-proof film 27 stacked on the surface of the plastic plate 26 facing the liquid crystal layer 14, a transparent electrode 28 made of ITO (indium tin oxide) and stacked on the surface of the moisture-proof film 27 and an alignment film 29 covering the transparent electrode 28. The second substrate 12 is further provided with a color filter (not shown).

Figure 3:
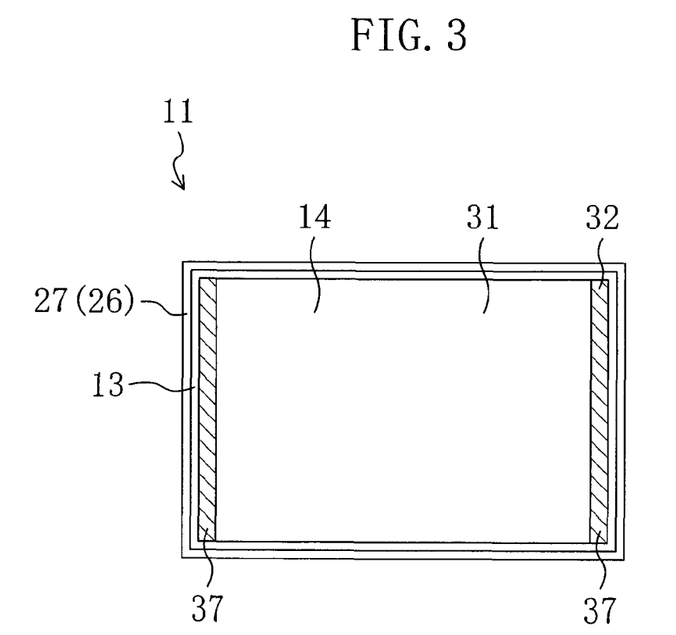
FIG. 3 is a plan view of a second substrate.

As shown in a plan view of the second substrate 12 of FIG. 3, the liquid crystal layer 14 is enclosed with a substantially rectangular frame-like sealing member 13 and sealed between the first substrate 11 and the second substrate 12. An area located inside the sealing member 13 is a display area 31 which contributes to display. Areas located outside the display area are non-display areas 32 which do not contribute to the display. The sealing member 13 may be made of a non-conductive resin having high adhesion such as an epoxy resin. The sealing member 13 is preferably made of a highly elastic thermoplastic resin such as a silicone resin and a thermoplastic elastomer. The sealing member 13 is formed along the four sides of the first and second substrates 11 and 12 and keeps the first and second substrates 11 and 12 in close contact. For example, nematic liquid crystal is preferably used as the liquid crystal material. The liquid crystal material may be cholesteric or smectic.

The display area 31 is preferably rectangular or substantially rectangular as shown in FIG. 3. With the existence of the spacers 25, the thickness of the liquid crystal layer 14, i.e., the gap between the first and second substrates 11 and 12 (hereinafter may be referred to as a cell gap) is kept uniform. The spacers 25 are also formed in a portion of the non-display area 32.

As a feature of a preferred embodiment of the present invention, a relief area 33 in which the gap between the first substrate 11 and the second substrate 12 is larger than that in the display area 31 is provided in at least a portion of each of the non-display areas 32 as shown in FIG. 1. The relief areas 33 relieve the force applied to bend the first and second substrates 11 and 12.

To be more specific, walls 35 which are taller than the spacers 25 are provided in at least a portion of each of the non-display areas 32 between the first and second substrates 11 and 12. The difference in height between the walls 35 and the spacers 25 is preferably about 0.5 μm, for example. Each of the walls 35 is arranged between the display area 31 and the sealing member 13 to be in contact with the inner surface of the sealing member 13.

The wall 35 preferably includes two elements, i.e., a spacer 36 formed on the first substrate 11 and a sealing barrier 37 formed on the second substrate 12 so as to overlap the spacer 36. The spacer 36 and the sealing barrier 37 are preferably made of the same photosensitive resin used as the spacers 25. As shown in FIG. 3, the walls 35 are formed on two sides of the display area 31 which are not bent, respectively. In other words, the relief areas 33 are provided on the two sides of the display area 31 which are not bent, respectively.

As both of the first and second substrates 11 and 12 are flexible, the height of the gap between the substrates 11 and 12 is gradually reduced in the directions from the wall 35 to the inside (toward the display area 31) and the outside. A portion of the non-display area 32 inside the wall 35 serves as the relief area 33. The relief area 33 of the present preferred embodiment is provided between the inner surface of the wall 35 and the display area 31 as shown in FIG. 1.

Manufacturing Method

Then, referring to FIGS. 2 and 3 and FIGS. 6 to 12 which are sectional views illustrating the manufacturing steps, a method for manufacturing the liquid crystal display device will be described.

Figure 6:
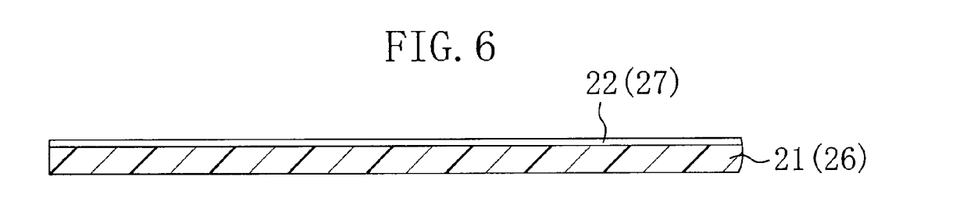
FIG. 6 is a sectional view illustrating the step of forming a moisture-proof film on a plastic plate.
Figure 7:
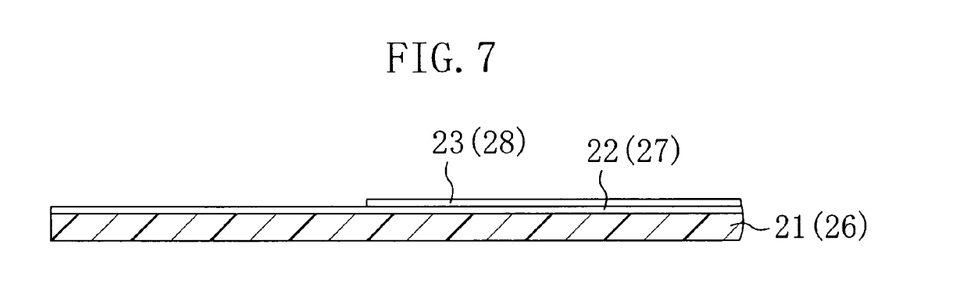
FIG. 7 is a sectional view illustrating the step of forming an electrode on the plastic plate.

As shown in FIG. 6, an about 1000 Å thick SiO$_2$ film is formed by sputtering on at least one of the surfaces of each of the plastic plates 21 and 26 which are film plates of about 50 μm in thickness, for example. The SiO$_2$ films function as the moisture-proof films 22 and 27. Then, ITO is sputtered on the plastic plates 21 and 26 to form the electrodes 23 and 28 on the surfaces of the moisture-proof films 22 and 27, respectively, as shown in FIG. 7. TFTs are formed on the plastic plate 21 and a color filter and the like are formed on the plastic plate 26 by a known method.

Figure 8:
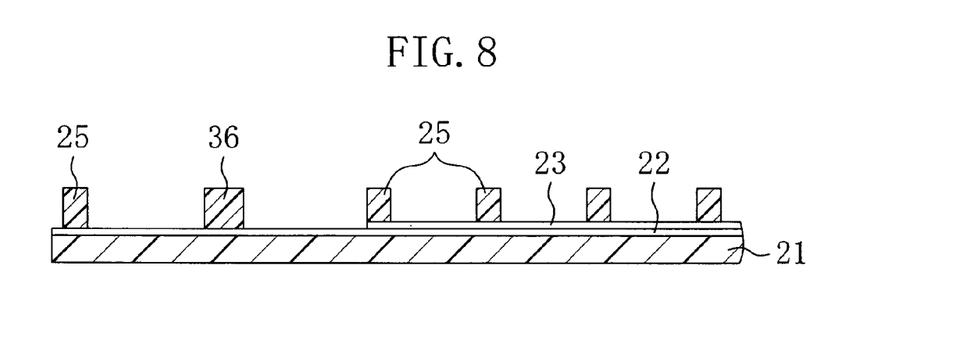
FIG. 8 is a sectional view illustrating the step of forming spacers.

Then, as shown in FIG. 8, a negative photosensitive resin (e.g., JNPC80 manufactured by JSR Corporation) is applied to the plastic plate 21 and subjected to photolithography to form a plurality of photo spacers 25 arranged at regular intervals. At the same time, the spacers 36 as part of the walls 35 are also formed from the same material as the photo spacers 25. Each of the photo spacers 25 is substantially column-shaped and has a height of about 5 μm and a diameter of about 20 μm, for example.

Figure 9:
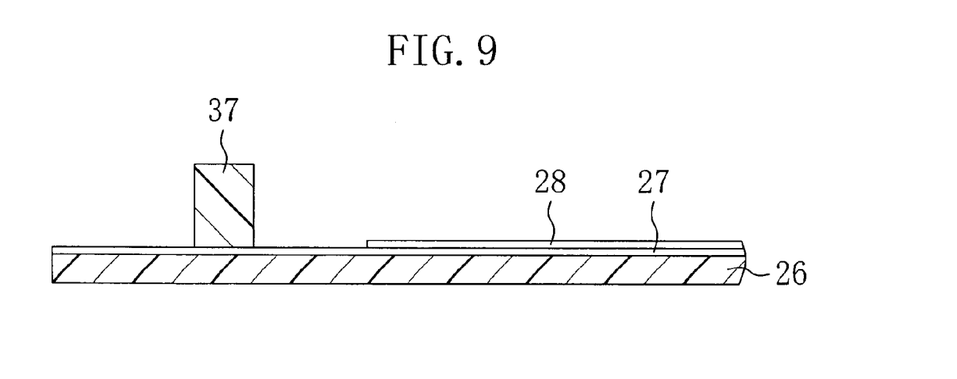
FIG. 9 is a sectional view illustrating the step of forming a sealing barrier.

On the plastic plate 26, the same material used to form the photo spacers 25 is applied and subjected to photolithography to form the sealing barriers 37 as part of the walls 35 as shown in FIG. 9. The sealing barriers 37 have a sectional height of about 0.5 μm and a width of about 40 μm, for example, and are shaped into walls extending along the two sides of the plastic plate 26 which are not bent, respectively, as shown in FIG. 3.

Figure 10:
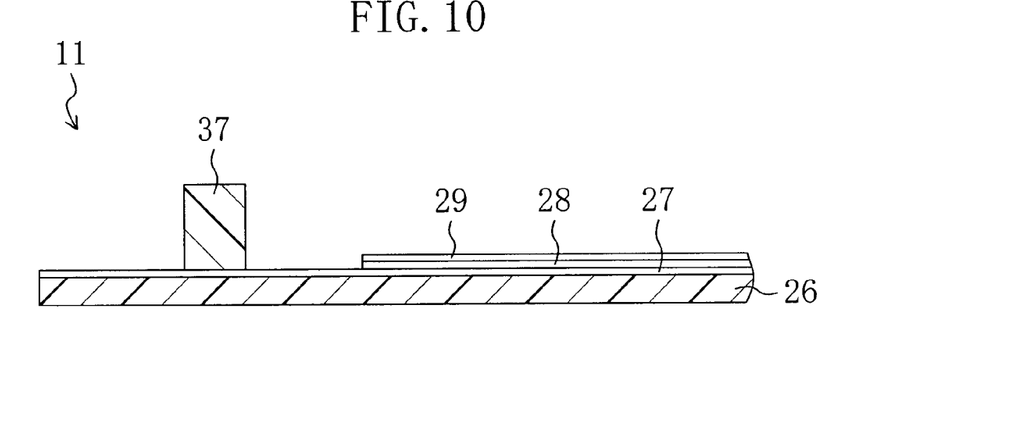
FIG. 10 is a sectional view illustrating the step of forming an alignment film.

Then, as shown in FIG. 10, an alignment film is spin-coated on the plastic plate 26 to cover the transparent electrode 28 and baked. Then, the alignment film is rubbed to give an alignment property. Thus, the second substrate 12 provided with the sealing barriers 37 is completed. An alignment film is also formed on the plastic plate 21 to cover the pixel electrode 23 to complete the first substrate 11 provided with the photo spacers 25.

Figure 11:
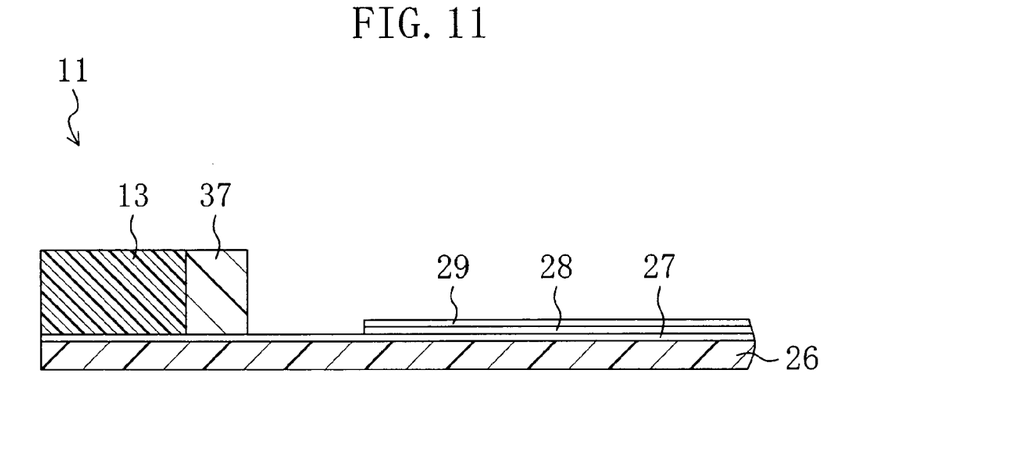
FIG. 11 is a sectional view illustrating the step of forming a sealing member.

Liquid crystal material is supplied between the first and second substrates 11 and 12 by drop injection in vacuum. First, as shown in FIG. 11, the sealing member 13 not cured yet is supplied onto the non-display areas 32 of the second substrate 12 in vacuum using a dispenser. To be more specific, as shown in FIG. 11, the sealing member 13 not cured yet is supplied in a portion of each of the non-display areas 32 close to and outside the sealing barrier 37.

Figure 12:
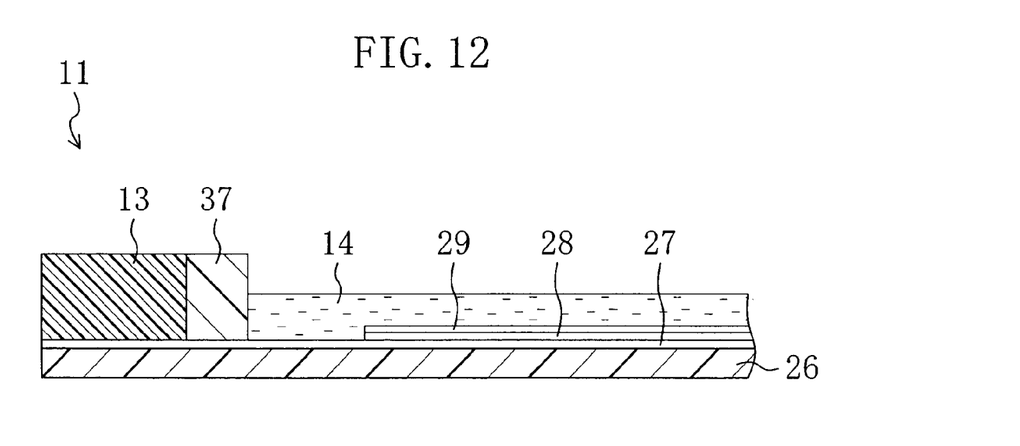
FIG. 12 is a sectional view illustrating the step of dropping liquid crystal material.

Then, as shown in FIGS. 3 and 12, the liquid crystal material is supplied onto a portion of the second substrate 12 inside the sealing member 13 and the sealing barrier 37 in vacuum. Subsequently, the first and second substrates 11 and 12 are sandwiched between two elastic sheets of about 2 mm in thickness, for example, in vacuum to bond the first and second substrates 11 and 12 together as shown in FIGS. 2 and 1. Then, the substrates are heated and pressed to cure the sealing member 13. At this time, the spacers 36 and the sealing barriers 37 overlap to form the walls 35 and portions of the first and second substrates 11 and 12 corresponding to the walls 35 are pushed outward in the thickness direction by the walls 35. As a result, relief areas 33 are provided in portions of the non-display areas 32 inside the walls 35, respectively.

Effects of First Preferred Embodiment

According to the first preferred embodiment, a plurality of spacers 25 are interposed between the first substrate 11 and the second substrate 12 as shown in FIG. 1. Therefore, the cell gap between the first substrate 11 and the second substrate 12 in the display area 31 is kept uniform. As shown in FIG. 4, when the liquid crystal display device 1 is bent by applying force thereto, tensile force is exerted on the edges of the first substrate 11 in the bending direction and compression force is exerted on the edges of the second substrate 12 in the bending direction due to the difference between the radius of curvature R1 of the first substrate 11 and the radius of curvature R2 of the second substrate 12. According to the present preferred embodiment, the relief areas 33 in which the cell gap is larger than that in the display area 31 are formed in the non-display areas 32. With the presence of the relief areas 33, the force exerted on the first and second substrates 11 and 12 is relieved and the first and second substrates 11 and 12 are less deformed by the tensile force and the compression force.

Figure 5:
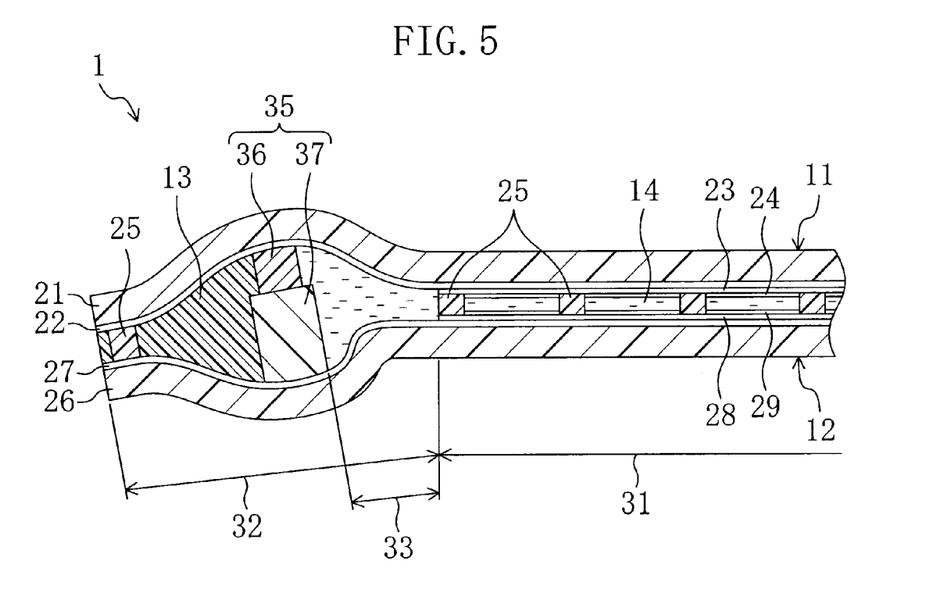
FIG. 5 is an enlarged sectional view illustrating a major portion of the liquid crystal display device in a bent state.

As shown in FIG. 4, when the display device is bent such that the first substrate 11 protrudes outward, the tensile force exerted on the first substrate 11 is relieved as portions of the first substrate 11 in the relief areas 33 are deformed to return from the bent state to the flat state as shown in an enlarged sectional view of FIG. 5. At the same time, the compression force exerted on the second substrate 12 is relieved as portions of the second substrate 12 in the relief areas 33 are slightly recessed toward the first substrate 11.

With this configuration, the cell gap in the display area 31 is kept uniform by the spacers 25, while the relief areas 33 near the sealing member 13 prevent the first and second substrates 11 and 12 from significant deformation in the direction away from each other. As a result, the cell gap failure in the display area is prevented, the reduction of display quality is restrained and the application of significant peel stress to the sealing member 13 is prevented. Thus, the reliability of the device is improved.

The relief areas 33 are formed by interposing the walls 35 between the first substrate 11 and the second substrate 12. Since the walls 35 and the spacers 25 are made of the same material, the spacers 36 as part of the walls 35 and the spacers 25 are formed on the first substrate 11 in the same step.

As the display area 31 is rectangular or substantially rectangular, the deformation of the first substrate 11 and the second substrate 12 occurs on two sides of the display area 31 which are not bent. The relief areas 33 and the walls 35 of the present preferred embodiment are provided along the two sides which are not bent. Therefore, the cell gap failure is effectively prevented.

Further, as each of the walls 35 is provided between the display area 31 and the sealing member 13, the wall 35 functions as a barrier for separating the sealing member 13 and the liquid crystal layer 14. That is, the wall 35 prevents the sealing member 13 not cured yet from leaching into the liquid crystal layer 14 as an impurity and makes the reduction of display quality less likely to occur. It may be possible to form a portion of the sealing member 13 within the wall 35. However, it is not preferable to form the sealing member 13 inside the wall 35 from the aspect of preventing the sealing member 13 from leaching.

Second Preferred Embodiment

Figure 16:
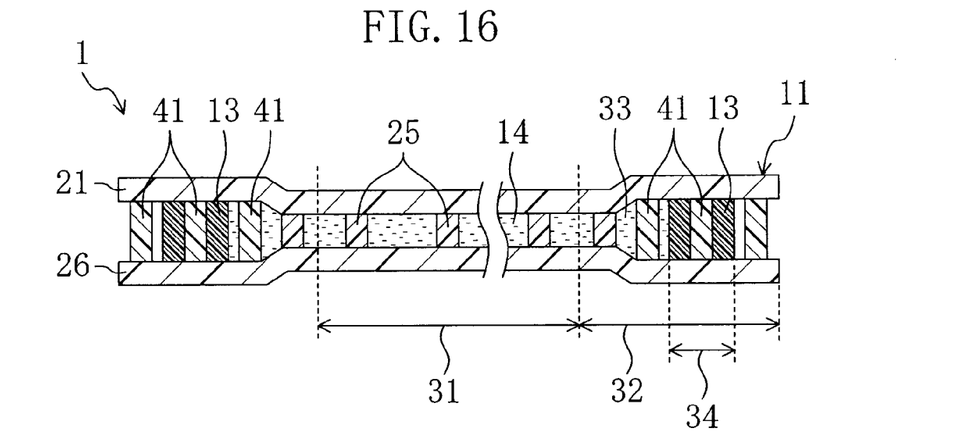
FIG. 16 is a sectional view illustrating the structure of a liquid crystal display device of a second preferred embodiment of the present invention.
Figure 17:
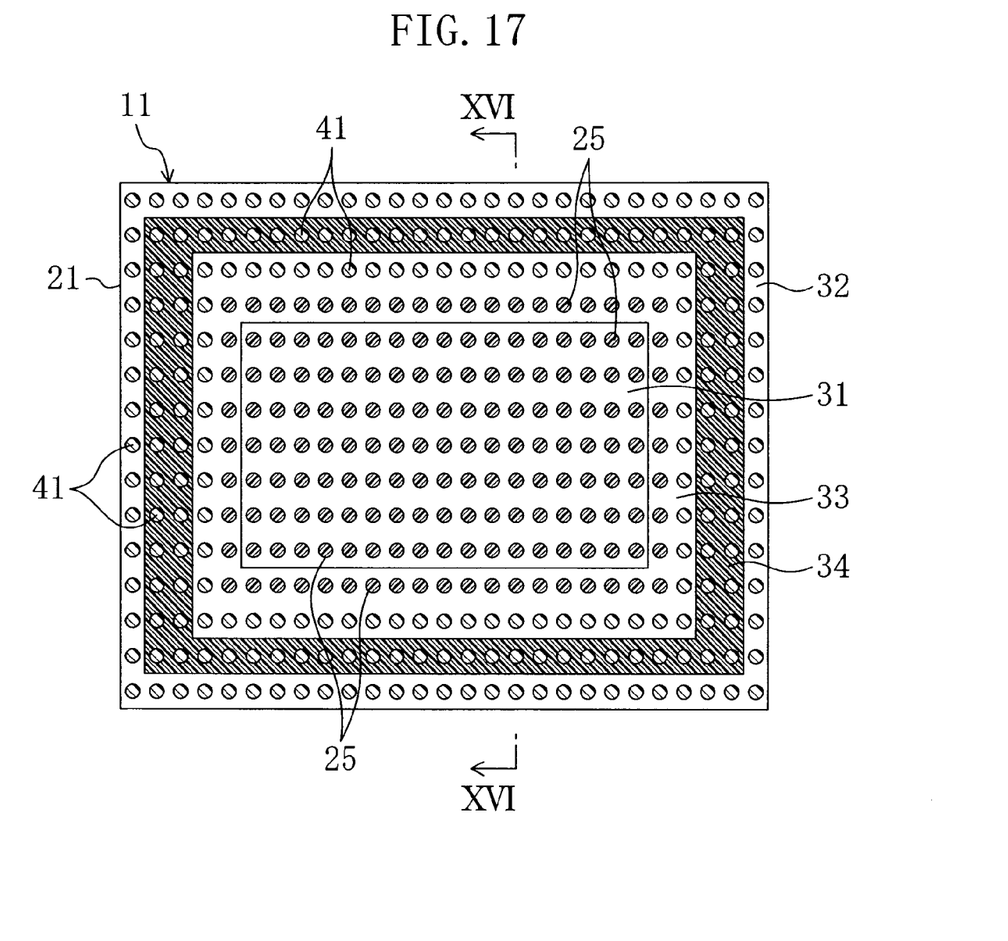
FIG. 17 is a plan view illustrating the layout of spacers on a first substrate.

FIGS. 16 to 19 show a second preferred embodiment of the present invention. In the following preferred embodiments, the same components as those shown in FIGS. 1 to 15 are indicated by the same reference numerals to omit detailed explanation. FIG. 17 is a plan view illustrating a first substrate 11 on which spacers 25 and 41 are formed. FIG. 16 is a sectional view taken along the line XVI-XVI of FIG. 17. The moisture-proof film and the alignment film are omitted from FIG. 16.

According to the first preferred embodiment, the relief areas 33 are formed by providing the walls 35. In contrast, the relief area 33 of the second preferred embodiment is formed by providing spacers 41 for the non-display area.

To be more specific, as shown in FIGS. 16 and 17, the spacers 25 are formed in the display area 31 in the same manner as the first preferred embodiment and a plurality of spacers 41 for the non-display area taller than the spacers 25 are formed in the non-display area 32 at regular intervals. Just like the spacers 25, the spacers 41 for the non-display area are substantially cylindrical photo spacers. The spacers 41 for the non-display area are adapted to determine the gap between the first and second substrates 11 and 12 in a sealing area 34 and its vicinity. The gap between the first and second substrates 11 and 12 in the sealing area 34 and its vicinity is larger than that in the display area 31. In the sealing area 34, a sealing member 13 made of a highly elastic thermoplastic resin such as a silicone resin or a thermoplastic elastomer is formed.

As shown in FIG. 17, the sealing area 34 in which the sealing member 13 is formed is a substantially rectangular frame-shaped area outside the display area 31. As shown in FIG. 16, the relief area 33 is in contact with the sealing area 34. In other words, the inner surface of the sealing member 13 is in direct contact with the liquid crystal layer 14 in the relief area 33.

The relief area 33 is formed between the sealing area 34 and the display area 31 and the maximum thickness of the relief area 33 is determined by the height of the spacers 41 for the non-display area. In the vicinity of the interface between the relief area 33 and the sealing area 34, the gap between the first and second substrates 11 and 12 is larger than that in the display area 31. Further, in the vicinity of the interface between the relief area 33 and the sealing area 34, the height of the sealing member 13 is greater than the gap between the first and second substrates 11 and 12 in the display area 31.

At least a portion of the relief area 33 is gradually reduced in thickness (cell gap) in the direction from the sealing area 34 to the display area 31. It is more preferable that the relief area 33 has a larger difference in thickness (cell gap). For example, the difference in thickness is preferably about 2 μm, for example.

Manufacturing Method

Figure 18:
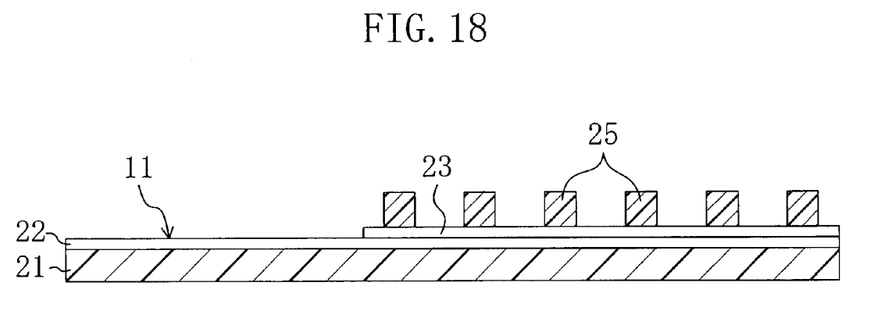
FIG. 18 is a sectional view illustrating the first substrate on which the spacers are formed.
Figure 19:
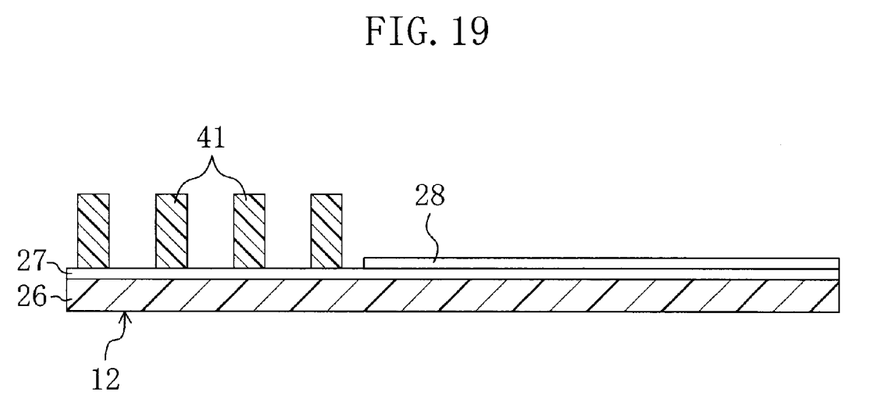
FIG. 19 is a sectional view illustrating a second substrate on which spacers for a non-display area are formed.

Referring to sectional views of FIGS. 18 and 19 illustrating the manufacturing steps, a method for manufacturing the liquid crystal display device 1 will be explained.

In the same manner as the first preferred embodiment, an approximately 1000 Å thick $SiO_2$ film is formed by sputtering on at least one of the surfaces of each of the plastic plates 21 and 26 which are film plates of about 50 μm in thickness, for example. The $SiO_2$ films function as the moisture-proof films 22 and 27. Then, ITO is sputtered on the plastic plates 21 and 26 to form the electrodes 23 and 28 on the surfaces of the moisture-proof films 22 and 27, respectively. TFTs are formed on the plastic plate 21 and a color filter and the like are formed on the plastic plate 26 by a known method.

Then, as shown in FIG. 18, a negative photosensitive resin (e.g., JNPC80 manufactured by JSR Corporation) is applied to the plastic plate 21 and subjected to photolithography to form a plurality of photo spacers 25 arranged at regular intervals. Each of the photo spacers 25 is substantially column-shaped and has a height of about 5 μm and a diameter of about 20 μm, for example.

On the plastic plate 26, as shown in FIG. 19, the same material used to form the photo spacers 25 is applied relatively thick and subjected to photolithography to form a plurality of photo spacers 41 for the non-display area at regular intervals in a particular area. Each of the spacers 41 for the non-display area is substantially column-shaped and has a height of about 10 μm and a diameter of about 20 μm, for example.

The spacers 25 may be formed only in the display area 31. However, for the high uniformity of the cell gap throughout the display area 31, the spacers 25 are preferably formed in a portion of the relief area 33 outside the display area 31. Alternatively, the spacers 25 may be formed throughout the display area 31, the relief area 33 and the sealing area 34.

To be more specific, the spacers 41 for the non-display area are formed in a portion or all of the non-display area 32 including the vicinity of the interface between the sealing area 34 and the relief area 33. The spacers 25 may be formed in the area for forming the spacers 41 for the non-display area. When the spacers 25 and the spacers 41 for the non-display area are configured not to overlap each other, the cell gap is determined by the height of the spacers 41 for the non-display area. If the spacers 25 and the spacers 41 for the non-display area are configured to overlap each other, the sum of the heights of the spacers 25 and 41 is the maximum thickness of the sealing member 13. Therefore, the thickness of the spacers 41 for the non-display area may be reduced. The spacers 41 for the non-display area may be made of different material from that of the spacers 25 or may have a layered structure including multiple layers.

Then, an alignment film is spin-coated on the plastic plate 26 to cover the transparent electrode 28 and baked. Then, the alignment film is rubbed to give an alignment property. Thus, the second substrate 12 is completed. An alignment film is also formed on the plastic plate 21 to cover the pixel electrode 23 to complete the first substrate 11 provided with the photo spacers 25.

Liquid crystal material is supplied between the first substrate 11 and the second substrate 12 by drop injection. First, in vacuum, the sealing member 13 is supplied onto a portion of the non-display area 32 of the second substrate 12 where the spacers 41 for the non-display area are formed.

Then, the liquid crystal material is supplied onto the area inside the sealing member 13 in vacuum. Subsequently, the first and second substrates 11 and 12 are sandwiched between two elastic sheets of about 2 mm in thickness, for example, in vacuum to bond the first and second substrates 11 and 12 together with the sealing member 13 interposed therebetween. If the sealing member 13 is a thermosetting resin such as an epoxy resin, the resin is cured by heating and pressing. If the sealing member 13 is a thermoplastic resin such as a silicone resin, the resin is softened by heating and pressed down to a predetermined thickness. At this time, the cell gap in the display area 31 is determined by the thickness of the spacers 25 and the cell gap in the vicinity of the interface between the sealing area 34 and the relief area 33 is determined by the thickness of the spacers 41 for the non-display area. Thus, the cell gap is continuously changed between the area provided with the spacers 25 and the area provided with the spacers 41 for the non-display area.

Effects of Second Preferred Embodiment

According to the second preferred embodiment, the relief area 33 allows obtaining the same effects as that of the first preferred embodiment. In addition, the second preferred embodiment achieves the following effect.

Since the relief area 33 is in contact with the sealing area 34, the sealing member 13 in contact with the relief area 33 is as thick as the relief area 33. For example, in the vicinity of the interface between the relief area 33 and the sealing area 34, the gap between the first and second substrates 11 and 12 or the height of the sealing member 13 is larger than the gap (cell gap) between the first and second substrates 11 and 12 in the display area 31. Therefore, the sealing member 13 is easily deformed at the interface with the relief area 33 by the compression and tensile forces exerted on the first and second substrates 11 and 12. In other words, the compression and tensile forces exerted on the first and second substrates 11 and 12 are relieved not only by the relief area 33 but also by the elastic deformation of the sealing member 13 in contact with the relief area 33. As a result, the reduction of display quality due to the cell gap failure in the display area 31 is less likely to occur and the sealing member 13 is prevented from falling off. Thus, the reliability of the device is improved.

If the sealing member 13 is made of a thermoplastic resin, the sealing member 13 is given with suitable elasticity. Since the spacers 41 for the non-display area taller than the spacers 25 in the display area 31 are formed in the non-display area 32, the maximum thickness of the relief area 33 is easily determined.

The liquid crystal display device 100 of Japanese Unexamined Patent Publication No. 2001-13508 does not include the relief area 33 of the present preferred embodiment. Specifically, as shown in FIG. 22, the gap between the first substrate 101 and the second substrate 102 is set larger in a portion of the non-display area where the spacers 106 are formed. However, the gap is gradually reduced toward the display area 110 with the sealing member 103 interposed therein and the relief area 33 is not provided. This is because the sealing member 103 is pressed and spread toward the display area 110 by the substrates 101 and 102 bonded together. Therefore, in the liquid crystal display device 100 of Japanese Unexamined Patent Publication No. 2001-13508, the force applied to the first substrate 101 and the second substrate 102 is not relieved and the sealing member 103 easily falls off when the substrates 101 and 102 are bent.

Other Preferred Embodiments

Figure 20:
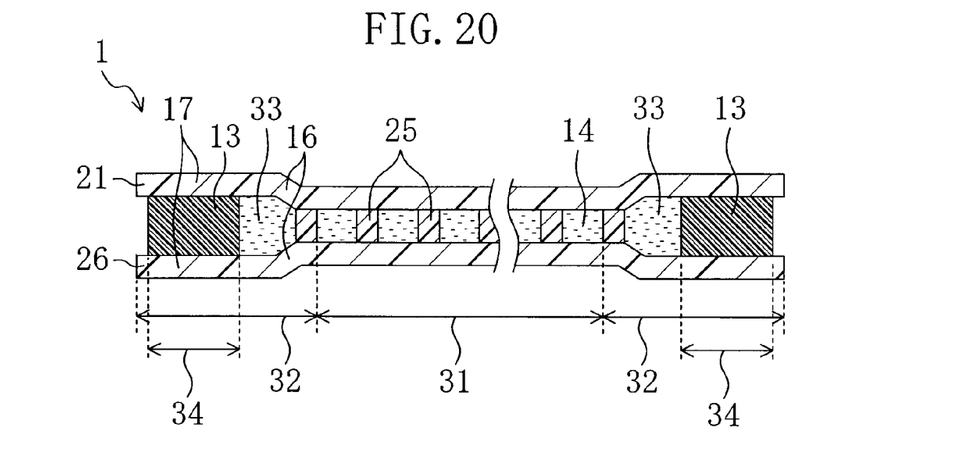
FIG. 20 is a sectional view illustrating another preferred embodiment of the liquid crystal display device.
Figure 21:
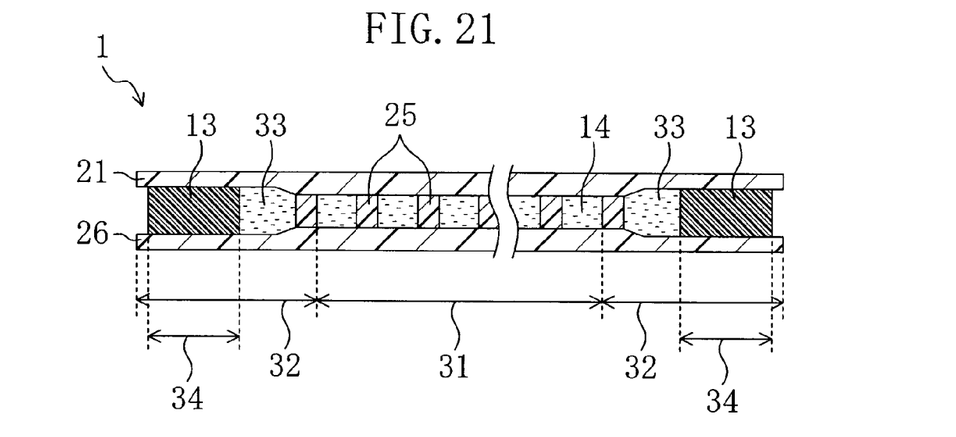
FIG. 21 is a sectional view illustrating still another preferred embodiment of the liquid crystal display device.

FIGS. 20 and 21 are sectional views illustrating other preferred embodiments of the present invention. In FIGS. 20 and 21, the moisture-proof film and the alignment film are omitted.

According to the second preferred embodiment, the spacers 41 for the non-display area are formed in the non-display area to set the gap between the first and second substrates 11 and 12 in the non-display area larger than that in the display area 31 for the purpose of providing the relief area 33. However, the relief area 33 can be provided without forming the spacers 41.

For example, in a liquid crystal display device 1 shown in FIG. 20, a portion of the first substrate 11 and a portion of the second substrate 102 in the non-display area 32 are deformed so as to protrude outward in the thickness direction of the liquid crystal layer. That is, each of the first substrate 11 and the second substrate 12 is provided with a sloping portion 16 inclined in the direction away from the display area 31 and a parallel portion continuous with the sloping portion 16. A sealing area 34 filled with the sealing member 13 is defined between the parallel portions 17 and the relief area 33 is provided between the sealing area 34 and the display area 31.

The side of the sealing member 13 facing the display area 31 between the parallel portions 17 is in contact with the liquid crystal layer 14 in the relief area 33. Therefore, the thickness of the relief area 33 is the maximum at the interface between the relief area 33 and the sealing area 34. If the plastic plates 21 and 26 are made of polycarbonate, the sloping portions 16 and the parallel portions 17 are formed by molding at a temperature of about 35° C. or higher using a particular mold, for example.

The relief area 33 may be formed by deforming at least one of the first and second substrates 11 and 12 to protrude outward in the thickness direction of the liquid crystal layer 14 in advance.

In a liquid crystal display device 1 shown in FIG. 21, each of the first substrate 11 and the second substrate 12 is configured to have a level difference on a portion of the surface facing the liquid crystal layer 14 in the non-display area 32. To be more specific, a portion of the first substrate 11 and a portion of the second substrate 12 in the non-display area 32 are thinned down from the surface facing inside to a predetermined thickness. Portions of the outer surfaces of the first substrate 11 and the second substrate 12 in the non-display area 32 are flush with portions of the outer surfaces in the display area 31. With this configuration, the sealing area 34 is defined between the thinned portion of the first substrate 11 and the thinned portion of the second substrate 12 in the non-display area 32 and the relief area 33 is formed between the sealing area 34 and the display area 31.

In this case, the side of the sealing member 13 facing the display area 31 is in contact with the liquid crystal layer 14 between the thinned portions of the substrates. Specifically, the thickness of the relief area 33 is the maximum at the interface between the relief area 33 and the sealing area 34. The relief area 33 may be provided by forming a level difference in the surface of at least one of the first and second substrates 11 and 12 facing the liquid crystal layer 14.

Figure 13:
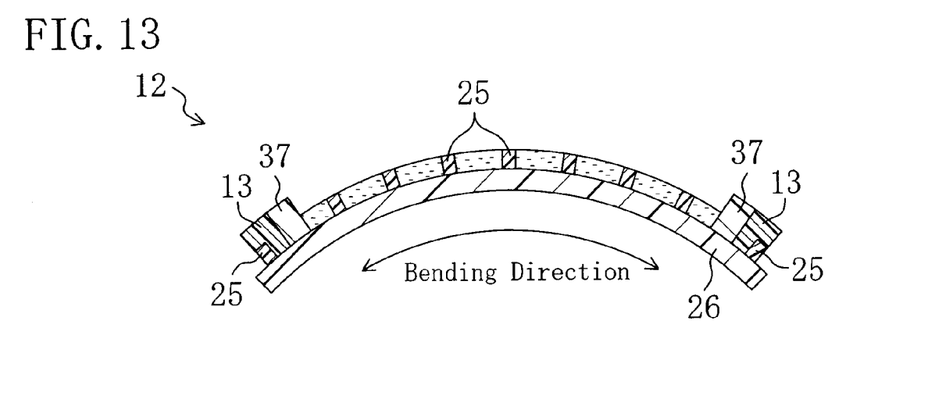
FIG. 13 is a sectional view illustrating the second substrate provided with spacers.

In the first preferred embodiment, the spacers 25 are formed on the first substrate 11. However, the present invention is not limited thereto and the spacers 25 may be formed on the second substrate 12 as shown in FIG. 13. With this configuration, the sealing barrier 37 and the spacers 25 are easily formed of the same material and in the same step.

Figure 14:
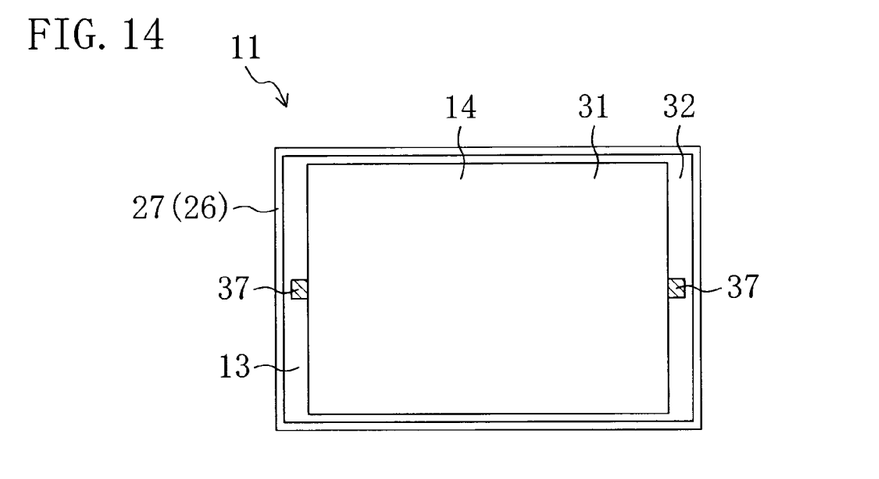
FIG. 14 is a sectional view illustrating the second substrate on which a portion of the sealing barrier is formed.
Figure 15:
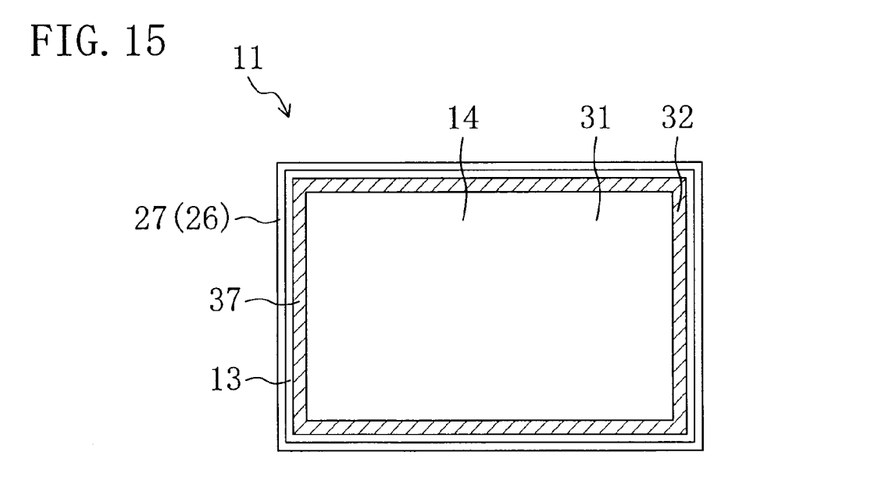
FIG. 15 is a sectional view illustrating the second substrate on which a frame-shaped sealing barrier is formed.

In the first preferred embodiment, the walls 35 and the relief areas 33 are provided along the two sides of the first substrate 11 and the second substrate 12 which are not bent. However, the present invention is not limited thereto. For example, as shown in FIG. 14, the walls 35 and the relief areas 33 may be provided in the middle of the two sides of the substrates which are not bent. Alternatively, as shown in FIG. 15, each of the wall 35 and the relief area 33 may be in the shape of a frame enclosing the display area 31. With this configuration, the cell gap failure is prevented even if the first and second substrates 11 and 12 are bent in any direction.

Instead of providing the wall 35, the relief area 33 may be formed by making a middle portion of the sealing member 13 taller than the spacers 25 in the display area 31. The wall 35 is not always formed of the spacer 36 and the sealing barrier 37 and may be formed of a single component.

In the second preferred embodiment, the spacers 25 are formed on the first substrate 11 and the spacers 41 for the non-display area are formed on the second substrate 12. However, the present invention is not limited thereto. For example, the spacers 41 for the non-display area may be formed on the first substrate 11 and the spacers 25 may be formed on the second substrate 12. Alternatively, both of the spacers 25 and 41 may be formed on one of the first and second substrates 11 and 12.

As described above, preferred embodiments of the present invention are useful for flexible liquid crystal display devices. In particular, preferred embodiments of the present invention are suitable for prevention of the reduction of display quality and improvement of the reliability of the device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
a first flexible substrate;
a second flexible substrate arranged to face the first flexible substrate;
a liquid crystal layer sealed between the first substrate and the second substrate by a frame-shaped sealing member;
a display area located inside the sealing member and arranged to contribute to display;
a non-display area located outside the display area and does not contribute to the display; and
a plurality of spacers interposed between the first substrate and the second substrate and having a height which determines a thickness of the liquid crystal layer; wherein
a wall which is taller than the spacers in the display area is provided in the non-display area to be interposed between the first substrate and the second substrate;
a gap between the first substrate and the second substrate in the non-display area is gradually reduced in a direction from an area where the wall is provided to the display area and also in a direction extending away from the display area from the area where the wall is provided;
a relief area in which the gap between the first substrate and the second substrate is larger than that in the display area is provided in the non-display area between the wall and the display area;
the sealing member is arranged on the side of the wall opposite the display area; and
a surface of the wall opposite the display area is in contact with the sealing member.

2. The liquid crystal display device of claim 1, wherein the display area is substantially rectangular and the relief area extends a side of the display area which is not bent.

3. The liquid crystal display device of claim 1, wherein the display area is substantially rectangular and the relief area has a frame-shaped configuration enclosing the display area.

4. The liquid crystal display device of claim 1, wherein the display area is substantially rectangular and the wall is arranged to extend along a side of the display area which is not bent.

5. The liquid crystal display device of claim 1, wherein the display area is substantially rectangular and the wall has a frame shaped configuration enclosing the display area.

6. The liquid crystal display device of claim 1, wherein the relief area is arranged to relieve a force applied to the first substrate and the second substrate.

7. The liquid crystal display device of claim 1, wherein the sealing member is made of a thermoplastic resin.

* * * * *